United States Patent Office 3,549,747
Patented Dec. 22, 1970

3,549,747
CONTACT LENS WETTING SOLUTION AND METHOD OF USING SAME
Joseph Z. Krezanoski and John C. Petricciani, Los Altos, Calif., assignors, by mesne assignments, to Flow Pharmaceuticals, Inc., Mountain View, Calif., a corporation of Nevada
No Drawing. Filed Feb. 20, 1968, Ser. No. 706,763
Int. Cl. A61k 27/00; A61f 9/00; G02c 7/04
U.S. Cl. 424—78                                12 Claims

ABSTRACT OF THE DISCLOSURE

A hypertonic contact lens wetting solution is provided which is useful in affording clearer vision and improved comfort to contact lens wearers. The wetting solution comprises a polymeric, viscosity-building agent, such as hydroxyethyl cellulose; a wetting agent such as polyvinyl alcohol; a microbial growth inhibitor, such as benzalkonium chloride; purified water; and sufficient amounts of essentially neutral, water-soluble salts, such as sodium chloride and potassium chloride, to make the solutions hypertonic. The wetting solution can also contain a disodium ethylenediamine tetraacetate chelating agent, if desired.

---

This invention relates to contact lens wetting solutions, and more particularly to hypertonic wetting solutions.

Many advances have been made in recent years in the manufacture and fitting of contact lenses. Nevertheless, clinical findings establish that most contact lens wearers invariably develop edema of the corneal epithelium. In order to reduce irritation of the corneal epithelium, a number of contact lens wetting solutions have been proposed. The solutions are designed to condition and prepare the contact lenses for wetting by natural tear fluid, and their use has made the wearing of contact lenses more tolerable, particularly in the newly initiated patient.

Prior art contact lens wetting solutions have primarily involved the use of polyvinyl alcohol as a wetting agent and methyl cellulose or hydroxyethyl cellulose as viscosity building agent. These prior art solutions have also contained sufficient amounts of water-soluble salts, generally sodium chloride, to make them isotonic with human serum and tear fluid.

It has been heretofore believed necessary to use isotonic contact lens wetting solutions so that the solutions will have the same osmotic pressure as the natural fluids of the eye, and so that they will be compatible with the intracellular eye fluids. Unfortunately, prior art, isotonic, polyvinyl alcohol-cellulosic wetting solutions do not affect the edemetous state of the corneas of contact lens wearers.

Corneal edema in contact lens wearers is not entirely understood, but it is believed to result from the contact lens interfering with normal corneal respiration and metabolism. Superficial edema subsides rapidly if the contact lenses are removed. Edema may occur in the morning before insertion of the lenses, or it may develop as a consequence of wearing the lenses for prolonged periods.

The visual acuity of the lens wearer is undesirably reduced while he is experiencing superficial edema. Further, if the development of superficial edema is not avoided or eliminated, stromal edema may develop. Continuation of the corneal insult can lead to erosion and damage of the corneal epithelium.

Although aggravated cases of such corneal insult can be treated by corrective lens modification and by cautioning the patient against any kind of excessive ocular trauma, a more desirable way of meeting this problem lies in the development of improved contact lens wetting solutions that can combat the loss of visual acuity and possible long-range corneal damage resulting from corneal edema.

It has now been found that the undesirable effects of corneal edema in contact lens wearers can be combatted, affording contact lens wearers improved visual acuity and protection from the long-range, more dangerous effects of corneal edema through the provision of a hypertonic contact lens wetting solution.

Accordingly, and to afford these benefits, the present invention provides a sterile, hypertonic contact lens wetting solution containing a viscosity-building agent, a wetting agent, a preservative for inhibiting microbial growth in the solution, water, and sufficient amounts of one or more alkali metal salts to render the solution hypertonic.

The invention consists in novel compositions, articles, products, and improvements shown and described. It is to be understood that both the foregoing general description and the following detailed description are exemplary and explanatory but are not restrictive of the invention.

The wetting solution of this invention is an aqueous solution. The inert nature of water, and the fact that it is a good solvent for the other ingredients of the present solution, together with its ready availability, make it the desirable base material for this solution. The water used in the solution is preferably purified by distillation, filtration, ion-exchange or the like.

The wetting solution of this invention contains a compatible, polymeric, viscosity-building agent. The viscosity-building agents must, of course, be water soluble. Either cellulosic polymers or natural gums are satisfactory viscosity-building agents for the solutions.

Thus, natural gums such as guar gum, gum tragacanth, gelatin and water-soluble starch derivatives can be used. Water-soluble cellulosic polymers such as hydroxyethyl cellulose, methyl cellulose, hydroxypropyl cellulose, carboxymethyl cellulose, and the like are preferred viscosity-building agents, with hydroxyethyl cellulose and methyl cellulose being considered optimum.

The viscosity-building agent used in the solution of this invention provide lens cushioning and corneal comfort, while avoiding stickiness of the eyelid and granulation on the eyelashes. These desirable properties are best achieved through the use of hydroxyethyl cellulose or methyl cellulose as the viscosity-building agents.

Sufficient amounts of the viscosity-building agent are added to the solution, to produce a wetting solution having a viscosity of about 15 to 750 cps. at 25° C. A viscosity of about 60 cps. at 25° C. is considered optimum. The use of medium viscosity cellulosic polymers, which are readily available commercially, is beneficial in achieving the desired viscosity in the wetting solution. Exemplary of such medium viscosity polymers are M grade hydroxyethyl cellulose available from Hercules, Inc., under the trademark Natrosol. A 2% solution of this polymer at 25° C. has a Brookfield viscosity of about 4500–6500. It is to be understood, however, that cellulosic polymers of widely varying viscosities can be used satisfactorily in the melting solutions of this invention. Thus, Natrosol polymers of viscosity grades H, G, and J from Hercules, Cellosize WP4400 from Union Carbide Corp. and various other commercially available hydroxyethyl cellulose can be used. The preferred grade of methyl cellulose for use in these wetting solutions is methyl cellulose U.S.P. XVII, which can be obtained commercially from Dow Chemical Co., Union Carbide and others.

Highly desirable contact lens wetting solutions are produced by the incorporation of 0.2 to 1.0% of the viscosity-building agents in the solution.

The contact lens wetting solution of this invention contains polyvinyl alcohol as the active wetting agent. The polyvinyl alcohol acts to initially wet the contact lenses and to keep them wetted until components of the natural tear fluid of the eye take over as a continuing wetting agent. Polyvinyl alcohol is an excellent wetting agent for contact lenses because it readily adsorbs on the polymethylmethacrylate material presently used in lens manufacture. Modified polyvinyl alcohols and other equivalent wetting agents can be substituted for the preferred polyvinyl aclohol agent, although the latter is preferred. Modification of the polyvinyl alcohol by distillation to remove impurities, or through the addition of polyvinyl acetate or the like, is not necessary to produce the solutions of this invention.

To serve the important wetting function, the polyvinyl alcohol or other wetting agent of this invention should be present in an amount of 0.1 to 5%. Surfactants or detergents are not needed in the solution of this invention, and are desirably omitted from it, since they can have an irritating effect on the eye of the user.

A preservative, designed to prevent or inhibit microbial growth is also included in the solution of this inventon. The inclusion of such preservatives is particularly important where multi-dose bottles of the solution are prepared. The preservatives prevent bacteria from contaminating the solution after its container has been opened and initial use made of a portion of the solution.

A preferred preservative is benzalkonium chloride. This compound is an alkyl substituted dimethylbenzylammonium chloride wherein the alkyl substituents are a mixture of $C_8$ to $C_{18}$ alkyl radicals. Other well-known preservative agents such as cetylpyridinium chloride, chlorhexidine, chlorobutanol and propyl or methyl parabin can be substituted wholly or partially for the preferred benzalkonium chloride preservative. In order to maintain sterility of the product during use, the preferred preservative should be present in an amount of about 0.002 to 0.02%, with the optimum concentration being about 0.01%.

The contact lens wetting solution of this invention can optionally contain about 0.01 to 0.2% of disodium ethylenediamine tetraacetate, commonly known as sodium edetate. Sodium edetate provides additional protection against pseudomonal contamination, and also acts as a chelating or water softening agent. The sodium edetate ties up divalent and trivalent cations often present in the water, thereby preventing undesirable precipitates from forming and ultimately fogging the contact lens surface. Preferred embodiments of the solution of this invention contain the sodium edetate additive.

A sufficient amount of an essentially neutral water-soluble alkali metal salt is incorporated in the solutions of this invention to render them hypertonic.

As pointed out above, it has heretofore been believed that contact lens wetting solutions must be isotonic with human serum and tear fluid. That is, the prior art solutions have contained the same salt concentration as that present in the serum and tear fluid of the user. Normally, isotonic solutions contain 0.9% sodium chloride, or another salt or a mixture of salts having a tonicity equivalent to that of 0.9% sodium chloride.

The essence of the present invention is the incorporation of sufficient alkali metal salts in the wetting solution to render it hypertonic, i.e., to give it a salt concentration and hence an osmotic pressure higher than that of the serum and tear fluid of the contact lens wearer. Since the normal tonicity of human serum and tear fluid is 0.9% (9.0 grams of sodium chloride per liter of fluid), to achieve the beneficial results of the present invention the contact lens wetting solution must have a salt content equivalent to the tonicity of at least a 0.91% NaCl solution.

It will be appreciated that the osmotic pressure of the natural fluids of the eye may vary somewhat from one individual to another. Accordingly, it is generally advantageous for the wetting solutions of this invention to contain the equivalent of 1.0 to 1.5% of sodium chloride. This range of tonicity is high enough to provide hypertonic solutions that can be mass produced for the vast majority of contact lens wearers. When the total tonicity of the formulation exceeds about 1.5%, the solution can produce mild stinging sensations in some wearers, and about 1.5% is therefore the upper limit of hypertonicity prescribed for the present solution. A tonicity equivalent to about 1.1% of NaCl is considered optimum in the solutions of this invention.

It is to be understood that one or more essentially neutral, water-soluble, alkali metal salts can be substituted in whole or in part for sodium chloride in the solutions of this invention. Thus, other alkali metal halides, such as sodium bromide, potassium chloride, potassium fluoride or potassium bromide can be used. Other salts, such as sodium sulfate, potassium sulfate, sodium nitrate, sodium phosphate, potassium nitrate or potassium phosphate can also be used. The tonicity of the solutions of this invention, however, is stated in terms of sodium chloride, and when such other salts are used, they should be present in amounts equivalent to the tonicity of 0.91 to 1.5% sodium chloride solutions.

It has been found that optimum contact lens wetting solutions are produced using mixtures of sodium chloride and potassium chloride. The ratio of NaCl to KCl in these solutions is generally between about 2 to 1 and 10 to 1, and preferably between about 4 to 1 and 7 to 1. Optimum contact lens solutions produced in accordance with this invention contain both sodium chloride and potassium chloride in a NaCl to KCl ratio of about 5 to 1 and have a total tonicity equivalent to about 1.1% sodium chloride.

It must be remembered that the solutions described here in are designed primarily to be produced for mass distribution and are designed for the normal, average person whose serum and tear fluid have a tonicity equivalent to about 0.9% sodium chloride. To achieve the benefits of the present invention, however, it is necessary that the wetting solution be hypertonic with respect to the serum and tear fluid of the particular person treated. Thus it is not claimed that the optimum compositions of this invention, which are designed for mass distribution, will be suitable for all individuals, and it may be necessary in some cases to design particular solutions having high tonicities of about 1.5% sodium chloride.

It should be noted in this regard that strongly hypertonic solutions containing glycerol and sodium chloride have in the past been employed on occasion by ophthalmologists as a means for reducing corneal edema in post-surgical techniques and the like. These strong solutions generally contain 5 to 10% sodium chloride and are in no way related to the mildly hypertonic wetting solutions of the present invention. In fact, the unexpected discovery of the present invention is that mildly hypertonic wetting solutions afford improved visual acuity and comfort to contact lens wearers.

The contact lens wetting solutions of this invention preferably have a slightly acid pH, for example, between about 5.5 and 6.5. While such acid pH's are not necessary, they are desirable in giving the product maximum stability and shelf life. The solutions are not buffered, however, and therefore do not resist conversion to a normal pH by tear fluid which usually has a pH of about 7.4. The elimination of buffers from the present solution is desirable because strongly buffered solutions can cause temporary stinging and discomfort of the eye.

The provision of the sterile, mildly hypertonic contact lens wetting solutions of this invention allow effective wetting of contact lenses, aid in lens transfer and insertion, cushion the lens on the cornea and make it more compatible with tear fluid and with the cornea on insertion, and increase the wearing comfort both on insertion and after prolonged wear. The present wetting solutions can be well tolerated by contact lens wearers and avoid initial stinging and lens fogging on insertion of the lenses.

It is not known whether all of these advantages are derived from the hypertonicity of the present solutions or whether some of them flow from a combination of this hypertonicity with benefits derived from the remaining specified ingredients of the composition. Applicants accordingly do not wish to be limited to any particular theory for the success of their invention.

For a clearer understanding of the invention, specific examples of it are set forth below. These examples are merely illustrative and are not to be understood as limiting the scope and underlying principles of the invention in any way. All parts and percentages referred to herein are parts by weight in terms of unit volume of solution unless otherwise specifically indicated. Thus a sodium chloride content of 0.9% in the solution is equivalent to 9.0 grams of sodium chloride per liter or solution.

Specific examples of the compositions of this invention are set forth in the following examples.

EXAMPLE 1

| Solution composition: | Percent |
| --- | --- |
| Hoydroxyethyl cellulose (medium viscosity) | 0.5 |
| Polyvinyl alcohol | 1.0 |
| Benzalkonium chloride | 0.01 |
| Sodium chloride | 0.9 |
| Disodium edetate | 0.025 |
| Purified water | Balance to 100 |

This mixture is produced by adding the hydroxyethyl cellulose to the water at a temperature of 180° F. and stirring for about 30 minutes until a solution is achieved. The remaining materials are then added and the entire solution is stirred for about 2 hours. The solution is then autoclaved (120° C., 15 lbs. pressure for 30 minutes) and upon cooling is aseptically dispensed into presterilized bottles.

EXAMPLE 2

| Solution composition: | Percent |
| --- | --- |
| Hydroxyethyl cellulose (med. vis.) | 0.5 |
| Polyvinyl alcohol | 1.0 |
| Benzalkonium chloride | 0.01 |
| Sodium chloride | 1.0 |
| Potassium chloride | 0.2 |
| Sodium edetate | 0.025 |
| Purified water | Balance to 100 |

EXAMPLE 3

| Solution composition: | Percent |
| --- | --- |
| Hydroxyethyl cellulose (med. vis.) | 0.5 |
| Polyvinyl alcohol | 1.0 |
| Benzalkonium chloride | 0.01 |
| Sodium chloride | 1.2 |
| Potassium chloride | 0.2 |
| Disodium edetate | 0.025 |
| Purified water | Balance to 100 |

EXAMPLE 4

| Solution composition: | Percent |
| --- | --- |
| Methyl cellulose (med. vis.) | 0.5 |
| Polyvinyl alcohol | 1.0 |
| Benzalkonium chloride | 0.01 |
| Sodium chloride | 1.4 |
| Potassium chloride | 0.3 |
| Disodium edetate | 0.025 |
| Purified water | Balance to 100 |

The compositions of Examples 2–4 exemplify the hypertonic wetting solutions of the present invention, while the solution of Example 1 is an isotonic wetting solution.

The solutions of Examples 1–4 were tested in normal contact lens wearers. Use of the hypertonic wetting solutions of Examples 2–4 were found to give clear vision almost immediately on initial insertion of the lenses in the morning. When the same persons used to isotonic wetting solution of Example 1, they invariably experienced some blurred vision during the first ten to thirty minutes following lens insertion.

The hypertonic wetting solutions of Examples 2–4 were also found to clear the vision of contact lens wearers when introduced into the eyes of such persons as eyedrops while the lenses remained on the cornea. The same beneficial results were obtained when the lenses were removed, wetted with the hypertonic solution and reinserted. The beneficial results achieved through the use of the contact lens wetting solutions of Examples 2–4 were particularly marked in persons who had worn their lenses for prolonged periods of time.

The hypertonic wetting solutions of Examples 2–4 were also found to be particularly effective in clearing the vision of contact lens patients with established corneal edema. Use of the hypertonic wetting solutions allowed lenses to be worn comfortably and without fogging for prolonged periods of time.

It is obvious from these tests that although the composition of the present invention is primarily designed for use as a contact lens wetting solution, it can also be used in other ophthalmic procedures where hypertonic solutions are indicated.

The invention, in its broader aspects, is not limited to the specific details shown and described, but departures may be made from such details within the scope of the accompanying claims without departing from the principles of the invention and without sacrificing its chief advantages.

What is claimed is:

1. A method for improving the clarity of vision of contact lens wearers immediately upon the insertion of their lenses, and for improving the lens wearing comfort and wearing time for such contact lens wearers, said method comprising: wetting the lens prior to insertion with a sterile, hypertonic contact lens wetting solution containing a viscosity-building agent, a wetting agent, a preservative for inhibiting microbial growth in the solution, water, and sufficient amounts of a salt selected from the group consisting of alkali metal and alkaline earth metal salts to render said solution hypertonic with respect to the eye of the contact lens wearer in which the solution is used.

2. The method of claim 1 in which the amount of the selected salt in the wetting solution is sufficient to impart to said solution a tonicity in the range of about 1.0 to about 1.5%.

3. The method of claim 2 in which the salt in the wetting solution is at least one of sodium chloride and potassium chloride.

4. The method of claim 3 in which the wetting solution contains both sodium chloride and potassium chloride in a ratio of NaCl to KCl between about 2 to 1 and 10 to 1.

5. The method of claim 1 in which the viscosity-building agent is a water-soluble, cellulosic polymer selected from the group consisting of hydroxyethyl cellulose and methyl cellulose.

6. The method of claim 1 in which the wetting agent is polyvinyl alcohol.

7. The method of claim 6 in which the preservative is benzalkonium chloride.

8. The method of claim 7 in which the wetting solution also contains disodium ethylenediamine tetraacetate.

9. A sterile, hypertonic contact lens wetting solution containing a water-soluble, cellulosic polymer selected from the group consisting of carboxymethyl cellulose and hydroxyethyl cellulose as a viscosity-building agent; polyvinyl alcohol as a wetting agent; a preservative for inhibiting microbial growth in the solution; water; and sufficient amounts of sodium chloride and potassium chloride to render said solution hypertonic, said solution containing sodium chloride and potassium chloride in a ratio of NaCl to KCl between about 2 to 1 and 10 to 1.

10. The wetting solution of claim 9 in which the ratio of NaCl to KCl is between about 4 to 1 and 7 to 1.

11. A sterile, hypertonic contact lens wetting solution which comprises:

0.2 to 1.0% hydroxyethyl cellulose or methyl cellulose
0.1 to 5.0% polyvinyl alcohol
0.002 to 0.02% benzalkonium chloride
0.9 to 1.4% sodium chloride
0.2 to 0.3% potassium chloride
0.01 to 0.2% disodium ethylenediamine tetraacetate
and balance water.

12. The wetting solution of claim 9 which has a pH of about 5.5 to 6.5.

References Cited

UNITED STATES PATENTS

| | | | |
|---|---|---|---|
| 3,183,152 | 5/1965 | Szekely et al. | 424—78 |
| 3,311,577 | 3/1967 | Rankin | 260—17 |

OTHER REFERENCES

Hind et al., Journal of the American Pharmaceutical Asso. Practical Pharmacy Edition, vol. XI, No. 12, pp. 1–5 (December 1950).

Schradie et al., Ibid, vol. 20, No. 4, pp. 197–199 (April 1959).

WILLIAM H. SHORT, Primary Examiner

L. M. PHYNES, Assistant Examiner

U.S. Cl. X.R.

260—17, 29.6; 351—40, 160; 424—180